United States Patent
Seebaluck

(10) Patent No.: US 10,240,985 B2
(45) Date of Patent: Mar. 26, 2019

(54) OVERHEAT BLEED AIR DETECTOR AND METHOD OF MANUFACTURE

(71) Applicant: Kidde Technologies, Inc., Wilson, NC (US)

(72) Inventor: Dharmendr Len Seebaluck, Wake Forest, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 382 days.

(21) Appl. No.: 15/072,941

(22) Filed: Mar. 17, 2016

(65) Prior Publication Data
US 2017/0268933 A1    Sep. 21, 2017

(51) Int. Cl.
| | |
|---|---|
| *G01K 11/06* | (2006.01) |
| *B64D 13/06* | (2006.01) |
| *G01M 15/04* | (2006.01) |
| *G01K 3/00* | (2006.01) |
| G01K 13/02 | (2006.01) |

(52) U.S. Cl.
CPC .............. *G01K 11/06* (2013.01); *B64D 13/06* (2013.01); *G01K 3/005* (2013.01); *G01M 15/048* (2013.01); *B64D 2013/0618* (2013.01); *G01K 2013/024* (2013.01)

(58) Field of Classification Search
CPC ..................................................... G01K 11/06
See application file for complete search history.

(56) References Cited

U.S. PATENT DOCUMENTS

| | | | | |
|---|---|---|---|---|
| 2,050,991 A | * | 8/1936 | Atkinson | H01B 9/028 174/110 AR |
| 2,236,286 A | * | 3/1941 | Dunsheath | H01F 27/14 174/12 R |
| 3,668,373 A | * | 6/1972 | Laing | G01K 3/005 219/505 |
| 3,682,130 A | | 8/1972 | Jeffers | |
| 4,389,086 A | | 6/1983 | Furusawa et al. | |
| 4,690,197 A | | 9/1987 | Dannoura | |
| 4,818,279 A | | 4/1989 | Chaleat et al. | |
| 8,356,935 B2 | * | 1/2013 | Arora | E21B 43/24 374/136 |

(Continued)

FOREIGN PATENT DOCUMENTS

| | | |
|---|---|---|
| EP | 1645856 A1 | 4/2006 |
| EP | 2957877 A1 | 12/2015 |

OTHER PUBLICATIONS

Extended European Search dated Jun. 27, 2017 in related EP Patent Application No. 17161689.9, 8 pages.

*Primary Examiner* — Clayton E Laballe
*Assistant Examiner* — Leon W Rhodes, Jr.
(74) *Attorney, Agent, or Firm* — Cantor Colburn LLP

(57) ABSTRACT

A method of manufacturing an overheat bleed air detector includes providing a first elongate member having an inner surface that defines a plurality of grooves that extend from the first elongate member first end towards a first elongate member second end. The method further includes providing a second elongate member made of a ceramic based material and inserting the second elongate member within the first elongate member. An outer surface of the second elongate member is spaced apart from the inner surface of the first elongate member. The method still further includes inserting a center wire within the second elongate member.

13 Claims, 2 Drawing Sheets

(56) References Cited

U.S. PATENT DOCUMENTS 8,530,081 B2 * 9/2013 Hayashida .......... H01M 4/0404
429/122
2015/0369672 A1 * 12/2015 Ding ........................ C23C 2/04
374/185

* cited by examiner

OVERHEAT BLEED AIR DETECTOR AND METHOD OF MANUFACTURE

BACKGROUND

The present disclosure relates to an overheat bleed air detector and a method of manufacturing the overheat bleed air detector.

Aircraft are commonly provided with a bleed air system that provides air from an engine to a cabin environmental control system. Heat sensing elements are disposed within a duct or other piping that directs the bleed air from the engine to the cabin environmental control system. The heat sensing elements detect bleed air overheat.

BRIEF DESCRIPTION

According to an embodiment of the present disclosure, an overheat bleed air detector is provided. The overheat bleed air detector includes a first elongate member and a second elongate member. The first elongate member has a first elongate member body that extends between a first elongate member first end and a first elongate member second end. The first elongate member body has an inner surface at least one groove that extends from the first elongate member first end towards the first elongate member second end. The second elongate member is received within the first elongate member. The second elongate member has a second elongate member body that extends between a second elongate member first end and a second elongate member second end. The second elongate member body has an outer surface spaced apart from the inner surface.

According to another embodiment of the present disclosure, a method of manufacturing an overheat bleed air detector is provided. The method includes providing a first elongate member having an inner surface defining a plurality of grooves that extend from a first elongate member first end towards a first elongate member second end. The method further includes providing a second elongate member made of a ceramic based material and inserting the second elongate member within the first elongate member. An outer surface of the second elongate member is spaced apart from the inner surface of the first elongate member. The method still further includes inserting a center wire within the second elongate member.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
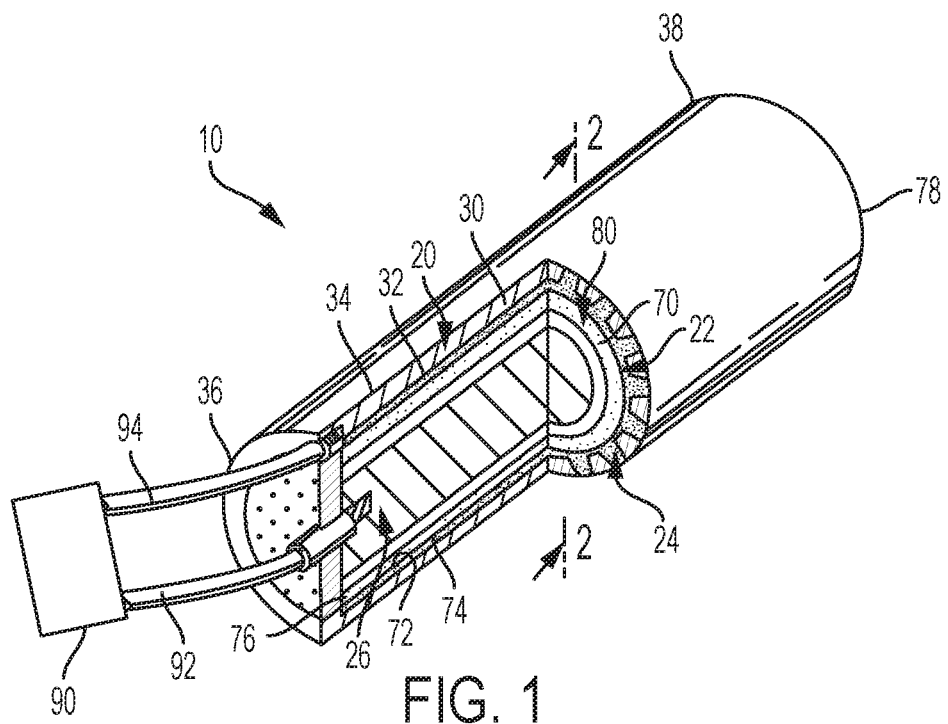
FIG. 1 is a perspective, partial sectional view of an overheat bleed air detector.

Referring to FIG. 1, a thermal sensor or overheat bleed air detector 10 is shown. The overheat bleed air detector 10 is configured to monitor or detect a temperature of bleed air greater than a threshold temperature that is provided to an aircraft environmental control system from an engine. The overheat bleed air detector 10 includes a first elongate member 20, a second elongate member 22, a state changing material 24, and a center wire 26.

The first elongate member 20 is configured as an outer electrode. The first elongate member 20 has a first elongate member body 30 having an inner surface 32 disposed opposite an outer surface 34. The inner surface 32 and the outer surface 34 of the first elongate member body 30 extend between a first elongate member first end 36 and a first elongate member second end 38. The first elongate member body 30 is a generally cylindrical or tubular body.

Figure 2:
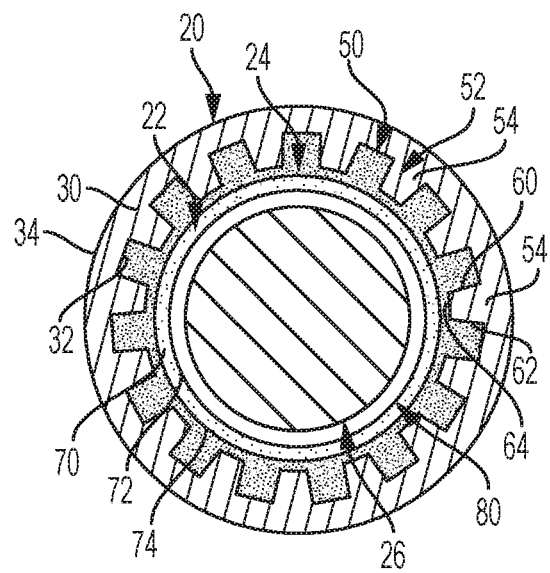
FIG. 2 is a cross-sectional view of the overheat bleed air detector along line 2-2.

Referring to FIGS. 1 and 2, the inner surface 32 defines an inner bore of the first elongate member 20. The inner surface 32 defines a plurality of grooves 50. In at least one embodiment, the plurality of grooves 50 may be configured as at least one groove. The plurality of grooves 50 extend from the first elongate member first end 36 towards the first elongate member second end 38. The plurality of grooves 50 define and separate a plurality of fins 52. In at least one embodiment, the at least one groove defines and separates at least one fin.

Each fin 54 of the plurality of fins 52 defines a first side surface 60, a second side surface 62, and a tip 64 that extends between the first side surface 60 and the second side surface 62. The first side surface 60 is disposed in a non-parallel relationship with the second side surface 62. In at least one embodiment, the first side surface 60 becomes progressively closer to the second side surface 62 in a direction that extends from a base of the fin 54 towards the tip 64 of the fin 54. In at least one embodiment, the tip 64 is substantially rounded.

The second elongate member 22 is received within the inner bore of the first elongate member 20. The second elongate member 22 has a second elongate member body 70 having an inner surface 72 disposed opposite an outer surface 74. The inner surface 72 and the outer surface 74 of the second elongate member body 70 extend between a second elongate member first end 76 and a second elongate member second end 78. The second elongate member body 70 is a generally cylindrical or tubular body.

The outer surface 74 of the second elongate member body 70 is spaced apart from and does not engage the inner surface 32 of the first elongate member body 30. The tip 64 of each fin 54 is spaced apart from and does not engage the outer surface 74 of the second elongate member body 70.

The second elongate member 22 is configured as a ceramic based insert. In at least one embodiment, the second elongate member 22 is a porous ceramic or glass. The porous ceramic includes non-conducting metal oxides such as alumina or glass. The porous ceramic may include glass fibers or any other suitable porous ceramic in membrane form.

The state changing material 24 is disposed between the inner surface 32 of the first elongate member body 30 of the first elongate member 20 and the outer surface 74 of the second elongate member body 70 of the second elongate member 22. The state changing material 24 engages the inner surface 32 of the first elongate member body 30 of the first elongate member 20 and the outer surface 74 of the second elongate member body 70 of the second elongate member 22. The state changing material 24 is disposed between and engages adjacent fins 54 of the plurality of fins 52 defined by the plurality of grooves 50 of the inner surface 32 of the first elongate member body 30 of the first elongate member 20.

The state changing material 24 is inserted between the inner surface 32 of the first elongate member body 30 of the first elongate member 20 and the outer surface 74 of the second elongate member body 70 of the second elongate member 22 while in a molten or liquid state. In at least one embodiment, the state changing material 24 impregnates the outer surface 74 of the second elongate member body 70 of the second elongate member 22. The state changing material 24 flows through a fill path defined by the outer surface 74 of the second elongate member body 70 of the second elongate member 22 and the plurality of fins 52 defined by the plurality of grooves 50 of the inner surface 32 of the first elongate member body 30 of the first elongate member 20. The fins of the plurality of fins 52, defined by the plurality of grooves 50, aid in the fluid flow of the state changing material 24 through the fill path.

The state changing material 24 may be a eutectic salt, a salt mixture, a conducting polymer film, or other phase changing material. The salts may include lithium, sodium, or potassium cations. The state changing material 24 is selected to provide a melting point temperature at a desired threshold temperature, i.e. 99° C. or above, indicative of an overheated bleed air. The state changing material 24 is configured to be non-conductive when in a solid state and is configured to be conductive when in a semi-solid or liquid state.

The center wire 26 is received within a bore defined by the inner surface 72 of the second elongate member body 70 of the second elongate member 22. In at least one embodiment, a sleeve or a gap 80 is disposed between the center wire 26 and the inner surface 72 of the second elongate member body 70 of the second elongate member 22. The center wire 26 is spaced apart from the inner surface 72 of the second elongate member 22 by at least one of the sleeve or gap 80. The center wire 26 is configured as an inner electrode. The center wire 26 is electrically connected to a controller 90 having or in communication with a first conductive lead 92 extending into the center wire 26 and a second conductive lead 94 extending into at least one of the first elongate member and the state changing material. The controller 90 is configured to measure or determine an impedance, resistance, voltage, current, or other electrical characteristic of the overheat bleed air detector 10. The measured electrical characteristic indicates whether the bleed air temperature is greater than or less than a threshold temperature.

The overheat bleed air detector 10 is disposed within or as in thermal communication with a duct that carries bleed air from the engine to the environmental control system. Responsive to a temperature of the bleed air less than a temperature threshold of the state changing material 24, the state changing material 24 remains in a solid state and a non-conductive state. The circuit created by the first elongate member 20 and the second elongate member 22 and the controller 90 remains open. Responsive to a temperature of the bleed air greater than the temperature threshold of the state changing material 24, the state changing material 24 melts and is in a conductive state. The circuit created by the first elongate member 20 and the second elongate member 22 and the controller 90 closes. The controller 90 sends a signal indicative of bleed air overheat condition or a bleed air temperature exceeding the temperature threshold.

During manufacturing of the overheat bleed air detector 10, the combination of the first elongate member 20 and the second elongate member 22 are coiled. The coiling of the first elongate member 20 and the second elongate member 22 may result in breaking or fracturing of the second elongate member 22. The break or fracture of the second elongate member 22 may create a non-uniform cross-section for the flow of the molten or liquid state changing material 24. The plurality of fins 52 defined by the plurality of grooves 50 defined by the inner surface 32 of the first elongate member body 30 improves the flow of the molten or liquid state changing material 24 and provides a substantially uniform or substantially homogeneous flow of the molten or liquid state changing material 24 between the first elongate member 20 and the second elongate member 22. A height of each fin of the plurality of fins 52 defined by the plurality of grooves 50 is sized to inhibit obstruction of the fill path by the breaking or fracturing of the second elongate member 22 during coiling.

The at least one fin or the plurality of fins 52 defined by the at least one groove or the plurality of grooves 50 improve detection of an overheat condition of the bleed air. The presence of the plurality of fins 52 improves heat transfer to the state changing material 24, i.e. improves/increases the heat transfer coefficient or increases/improves the heat transfer rate of the first elongate member 20 to allow for faster detection of the overheat condition, improving the overall detection performance of the overheat bleed air detector 10.

Figure 3:
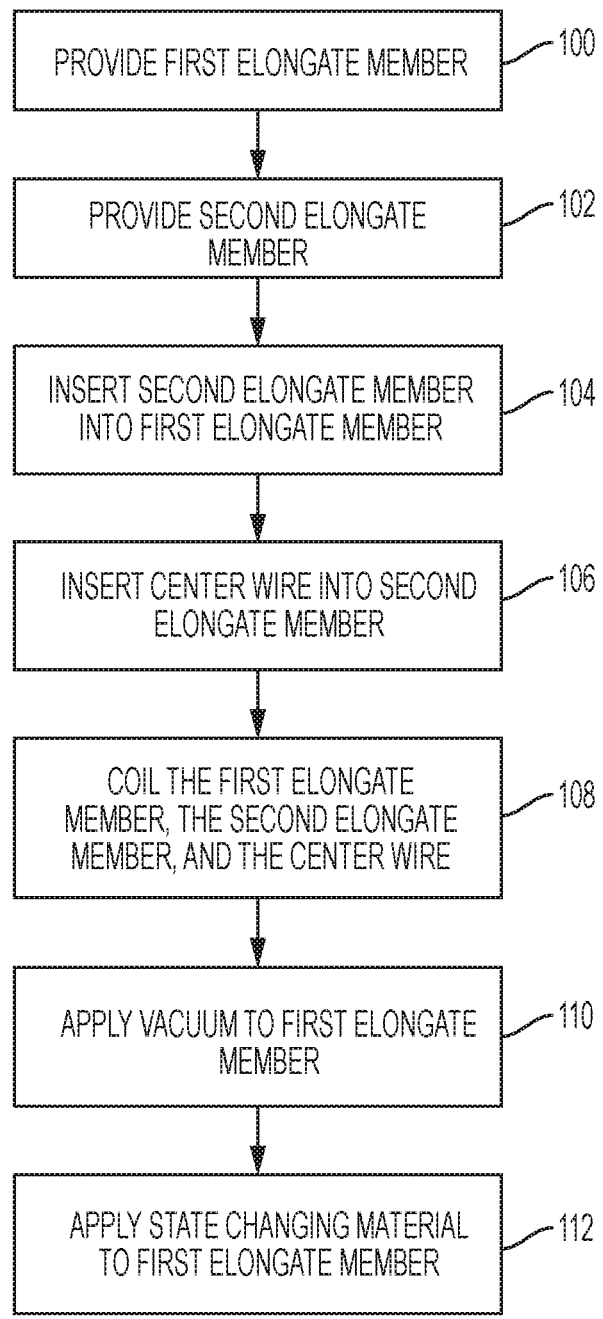
FIG. 3 is a flowchart of a method of manufacturing an overheat bleed air detector.

Referring to FIG. 3, a flowchart of a method of manufacturing the overheat bleed air detector 10 is shown. At block 100, the first elongate member 20 is provided. At block 102, the second elongate member 22 is provided. At block 104, the second elongate member 22 is inserted within the first elongate member 20. At block 106, the center wire 26 is inserted within the second elongate member 22. The center wire 26 is disposed concentric with the second elongate member 22 and the first elongate member 20.

At block 108 the combination of the first elongate member 20, the second elongate member 22, and a center wire 26 are coiled using the coiling apparatus. At block 110 a vacuum is applied to the second end 38 of the first elongate member 20. At block 112, the state changing material 24 is applied to the first end 36 of the first elongate member 20. The state changing material 24 is applied between the inner surface 32 of the first elongate member 20 and the outer surface 74 of the second elongate member 22.

The state changing material 24 is applied in a molten or liquid state. The vacuum applied to the second end 36 of the first elongate member 20 in conjunction with the plurality of fins 52 defined by the plurality of grooves 50 defined by the inner surface 32 of the first elongate member body 30 of the first elongate member 20 encourages or aids the molten or liquid state changing material 24 to flow from the first end 36 of the first elongate member 20 towards the second end 38 of the first elongate member 20 through the fill path. At block 110, the molten or liquid state changing material 24 is solidified to form the overheat bleed air detector 10.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An overheat bleed air detector, comprising:
    a first elongate member having a first elongate member body extending between a first elongate member first end and a first elongate member second end, the first elongate member body having an inner surface defining at least one groove that extends from the first elongate member first end towards the first elongate member second end;
    a second elongate member received within the first elongate member, the second elongate member having a second elongate member body extending between a second elongate member first end and a second elongate member second end, the second elongate member body having an outer surface spaced apart from the inner surface,
    a state changing material disposed between the first elongate member and the second elongate member; and
    a center wire disposed within the second elongate member, the center wire being spaced apart from an inner surface of the second elongate member by at least one of a sleeve and a gap, the center wire being electrically connected to a controller having a first conductive lead extending into the center wire and a second conductive lead extending into at least one of the first elongate member and the state changing material.

2. The overheat bleed air detector of claim 1, wherein the at least one groove is configured as a plurality of grooves that define at least one fin that extends from inner surface towards the second elongate member.

3. The overheat bleed air detector of claim 2, wherein the at least one fin improves a heat transfer coefficient of the first elongate member.

4. The overheat bleed air detector of claim 2, wherein the at least one fin includes a first side surface and a second side surface and a tip extending between the first side surface and the second side surface.

5. The overheat bleed air detector of claim 4, wherein the first side surface is disposed in a non-parallel relationship with the second side surface.

6. The overheat bleed air detector of claim 4, wherein the tip is spaced apart from the outer surface of the second elongate member.

7. The overheat bleed air detector of claim 4, wherein the tip is rounded.

8. The overheat bleed air detector of claim 4, wherein the second elongate member is configured as a ceramic based insert.

9. The overheat bleed air detector of claim 4, wherein the state changing material is disposed between adjacent grooves of the plurality of grooves.

10. A method of manufacturing an overheat bleed air detector, comprising:
    providing a first elongate member having an inner surface defining a plurality of grooves that extend from a first elongate member first end towards a first elongate member second end;
    providing a second elongate member made of a ceramic based material;
    inserting the second elongate member within the first elongate member, such that an outer surface of the second elongate member is spaced apart from the inner surface of the first elongate member;
    inserting a center wire within the second elongate member, the center wire being conductive and spaced apart from an inner surface of the second elongate member by at least one of a sleeve and a gap;
    applying a vacuum to the second end of the first elongate member; and
    applying a state changing material at the first end of the first elongate member, between the first elongate member and the second elongate member to impregnate the second elongate member with the state changing material.

11. The method of claim 10, wherein the plurality of grooves define a fill path for the state changing material.

12. The method of claim 10, wherein the plurality of grooves define and separate a plurality of fins that extend from the inner surface towards the second elongate member.

13. An overheat bleed air detector, comprising:
    a first elongate member having a first elongate member body extending between a first elongate member first end and a first elongate member second end, the first elongate member body having an inner surface defining at least one groove that extends from the first elongate member first end towards the first elongate member second end, the at least one groove is configured as a plurality of grooves that define at least one fin that extends from inner surface towards the second elongate member, the at least one fin includes a first side surface and a second side surface and a rounded tip extending between the first side surface and the second side surface;
    a second elongate member received within the first elongate member, the second elongate member having a second elongate member body extending between a second elongate member first end and a second elongate member second end, the second elongate member body having an outer surface spaced apart from the inner surface;
    a state changing material disposed between the first elongate member and the second elongate member; and
    a center wire disposed within the second elongate member, the center wire being electrically connected to a controller having a first conductive lead extending into the center wire and a second conductive lead extending into at least one of the first elongate member and the state changing material.

* * * * *